United States Patent [19]

Beere

[11] Patent Number: 4,592,685
[45] Date of Patent: Jun. 3, 1986

[54] DEBURRING MACHINE

[76] Inventor: Richard F. Beere, 27234 Washington Ave., Waterford, Wis. 53185

[21] Appl. No.: 572,556

[22] Filed: Jan. 20, 1984

[51] Int. Cl.$^4$ .............................................. B23C 3/12
[52] U.S. Cl. .................................. 409/138; 409/140; 83/200
[58] Field of Search .............. 409/138, 139, 140, 297, 409/298, 300, 301; 407/53; 83/199, 200

[56] References Cited

U.S. PATENT DOCUMENTS

| | | | |
|---|---|---|---|
| 1,747,713 | 2/1930 | Havlista | 407/53 |
| 1,883,567 | 10/1932 | Christman | 83/200 |
| 2,385,474 | 9/1945 | Schulz | 83/200 |
| 2,493,039 | 1/1950 | Sochia | 409/301 |
| 2,838,828 | 6/1958 | Nordstrom | 409/301 |
| 3,426,646 | 2/1969 | Lee et al. | 409/297 |

*Primary Examiner*—Gil Weidenfeld
*Assistant Examiner*—Daniel W. Howell
*Attorney, Agent, or Firm*—Arthur J. Hansmann

[57] ABSTRACT

A deburring machine which includes a power means and a rotating cutter plate adjacent a fixture which holds a work piece with a burr on the end. The cutter plate has a circular cutting opening therein which rotates past the work piece to remove the burr, and there can be a circular row of the cutting holes in the plate.

8 Claims, 6 Drawing Figures

DEBURRING MACHINE

This invention relates to a deburring machine, and, more particularly, it relates to a machine which cuts a burr from a work piece, such as the tip of a shaft.

BACKGROUND OF THE INVENTION

The metal working industry is well aware of the residual existence of a burr, in the form of an integral part of a shaft or the like, remaining on the end of a work piece, such as a shaft, after the shaft has otherwise been cut to its specified length. That is, a machined shaft commonly has a projection or burr remaining on the end of the shaft and which cannot conventionally and easily be removed, other than by grinding, filing, or otherwise removing or cutting the burr from the shaft to render the shaft smooth at that end.

Examples of both prior art work pieces with burrs and of prior art machines for removing the burrs are disclosed in U.S. Pat. Nos. 2,493,039 and 2,838,828 and 3,426,646. All three of these patents show deburring machines different from that disclosed herein, and U.S. Pat. No. 2,493,039 also shows a type of annular burr, rather than a pointed burr which is the type removed in the present invention.

The present invention differs from and improves upon the prior art in that it provides for a deburring machine which utilizes a planar surface having a circular cutting edge thereon and which is rotated past the work piece having the burr. The circular cutting edge presents an optimum shearing type of cut and it is of a dimension smaller than the surface of the work piece whereon the burr is located, so the work piece cannot be inserted into the circular cutting surface for damage of the work piece, and only the burr will be cleanly sheared from the work piece. With this arrangement, an operator can rapidly and conveniently position a work piece on a fixture adjacent the rotating circular cutting edge, and a mass production of the deburring can occur with only a very minimal of attention given to the labor involved of positioning and removing the work pieces in a rapid manner on the fixture while the cutter is being rotated past the work piece. Also, only a very minimum of skill is required in the deburring process, but yet the burr is removed in a neat and clean manner, such as in contrast to a grinding wheel which encounters the entire work piece surface and thereby diminishes it or at least scratches it.

In further contrast to the prior art, U.S. Pat. No. 2,838,828, shows the deburring tool which has a plurality of radial slots presented to the work piece and the burr thereon. However, the edge of the work piece could easily be tilted to penetrate the slots and thereby be damaged. Still further, the number of slots thus formed in the end of the work piece must necessarily be limited in order to retain strength of the tool, and it will be readily understood that only a limited number of the slots can be provided due to material availability in the tool carrying the slots, as compared to the present invention where a large number of circular cutting edges can be provided in the tool, and those circular cutting edges can be extremely close to each other for high speed cutting with only nominal speed of rotation of the cutter itself.

Further, the present invention improves upon the prior art and distinguishes thereover by providing a deburring machine which rapidly and neatly removes the burr from the work piece without endangering or marring the work piece surface carrying the burr, since the work piece surface cannot penetrate the circular cutting edge provided in this invention. Still further, there can be a cutter plate which is rotatably mounted and which has two or more rows of circular cutting edges at different radii from the axis of rotation, and an adjustable fixture can be employed for aligning the work piece with either one of the two circular rows of cutting edges, all so that one plate serves the purpose of either various cutting sizes or of presenting the greatest multiplicity of cutting edges with only one preparation or sharpening of the plate itself.

DETAILED DESCRIPTION OF THE PREFERRED EMBODIMENTS

Figure 1:
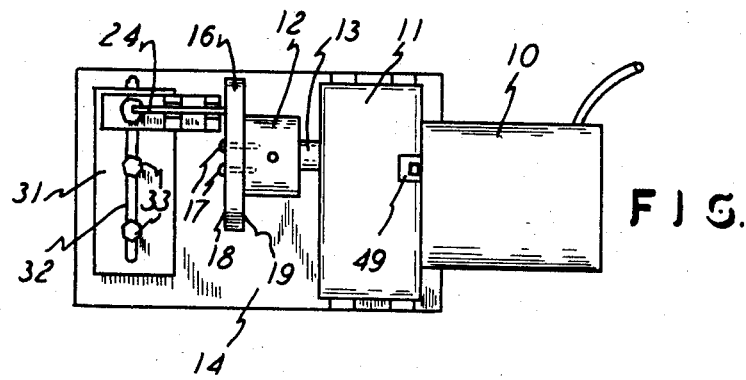
FIG. 1 is a top plan view of a deburring machine of this invention.
Figure 2:
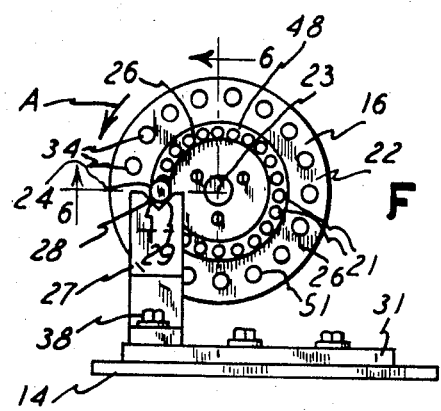
FIG. 2 is a left end elevational view of FIG. 1.

FIGS. 1 and 2 show the machine which therein shown includes electric motor 10 and a gear box 11 and an adaptor 12 which is rotatably driven off the shaft 13 extending from the box 11 in a conventional arrangement. A base plate 14 is provided for the mounting of the box 11 and the support of the elements shown on the plate 14.

A cutter 16 is removably attached, such as by means of screws 17, to the adaptor 12, and it has a planar face 18 disposed in a plane at right angles to the axis of the shaft 13, which is the axis of rotation of the adaptor 12 and the cutter 16. In fact, the cutter 16 can be reversed on the adaptor 12, and it then has another planar face 19 which is also shown at right angles to the axis of rotation, for a purpose hereinafter made apparent.

Figure 4:
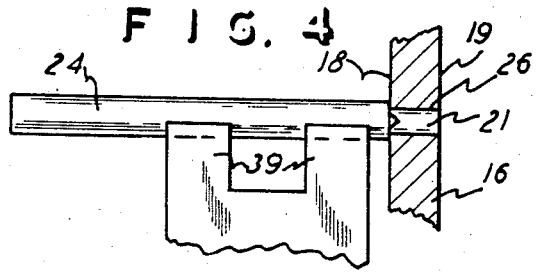
FIG. 4 is an enlarged side elevational view of the work piece of FIG. 3 and with enlarged fragments of the machine of this invention.

FIG. 2 shows that the cutter 16 has a plurality of circular cutting edges 21 in the face 22 of the cutter 16, and the circular or arcuate cutting edges 21 are in the form of circular openings, and they extend into and even through the cutter 16 and thus between the planar surfaces 18 and 19, such as shown in FIG. 4. Thus, FIG. 2 shows the axis or center 23 of rotation of the cutter 16 which is in the form of the circular cutter plate, as shown. Also, the openings 21 are disposed in a circular row, so that a great number of openings can be located on the cutter 16, and, in fact, the openings 21 can be located with space therebetween of approximately only the radius of each opening 21. Of course the circular row of openings 21 is concentric about the axis 23 of rotation, and thus a work piece 24 when aligned with the row of holes 21 is available for deburring by the arcuate cutting edges designated 26, and that is the upper circular half or portion of each hole 21 when the plate is rotated in the direction of arrow designated A in FIG. 2. The cutting opening or edge 26 is thus arcuate or circular, the optimum shearing action as well as self-alignment with respect to the work piece 24 is achieved.

FIGS. 1 and 2 further show a fixture 27 upstanding from the base plate 14 and having a V-shaped cradle in the upper end thereof, and the work piece is shown to be cylindrical and is nested in the work piece angle surfaces 29, for optimum alignment of the work piece 24 in the fixture 27, though the positioning is achieved only by the operator finger-positioning the work piece 24 on the fixture 27. It will be seen and understood that the deburring or cutting force is downwardly, and thus the fixture 27 which upwardly supports the work piece 24 is giving optimum support to the work piece during the deburring action.

The fixture 27 is connected with a base plate 31 which has a slot 32 therein for receiving two bolts 33. Therefore, the fixture 27 can be adjusted radially, relative to the axis 23 of rotation, when the plate 31 is slid relative to the bolts 33. In that manner, the work piece can be adjustably aligned with the row of holes 21. Also, another row of holes 34 is formed in the cutter 16, and they are actually shown to be bigger than the openings or holes 21. Therefore, the fixture 27 could be shifted to the left, as viewed in FIG. 2, and the work piece in the fixture 27 could be aligned with the circular row of holes 34 which row would of course again be concentric with the axis 23, as shown. In all instances, the diameter of the work piece 24, or its overall dimension on its end where the burr exists, is greater than the diameter of the holes 21 or the holes 34, respectively, and thus the work piece cannot be inserted into the holes and only the burr can enter the holes 21 and 34.

Figure 3:
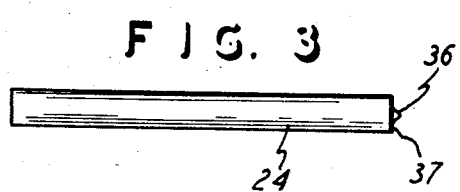
FIG. 3 is an enlarged side elevational view of a work piece for this invention.

FIG. 3 shows the work piece 24 which is a cylindrical piece having a burr 36 on the end surface 37, and the burr is actually a conical piece, and the end face or surface 37 of the work piece is a circular and planar face. As mentioned, the burr 36 commonly exists on the machining of the cylindrical work piece 24, though it is desired to remove the burr 36, and thus the deburring machine of this invention is utilized.

The fixture 27 is also shown to be connected with the base plate 14 by means of a screw 38, and thus the angulation of the fixture cradle surfaces 29 relative to the planar face 18 can be controlled, but normally a right angled relationship is utilized. FIG. 4 shows the fixture 27 with two spaced apart portions 39, each of which contain the cradle or V-shaped surfaces 29. With this arrangment, the cylindrical work piece is readily and automatically aligned by lying in the cradle 29 and by virtue of the spaced apart two point support rendered by the upstanding portions 39. Thus the operator can readily position the work pieces with minimum of attention and skill and at a high speed for repetitious deburring of each work piece so positioned.

FIG. 4 further shows that the cutter 16 has the cylindrical opening 21 extending completely therethrough, so that each planar face 18 and 19 presents a working face and the cutting edge formed by the inner section of the opening 21 with each face 18 and 19 forms the cutting surface of arcuate configurations. Therefore, the plate 16 can be reversed on the adaptor 12, or otherwise relative to the power means or motor 10, and thus the fresh cutting surfaces from either face 18 or 19 can be utilized without requiring interruption of sharpening of the faces 18 and 19.

FIG. 2 shows that there would be at least 22 of the holes 21 in the circular row thereof, and thus one revolution of the plate 16 actually presents 22 cutting surfaces to the work piece, and thus there are a considerable number of cutting actions for each revolution of the plate on any one or more work pieces, depending upon speed of insertion of the work piece relative to the speed of rotation.

Figure 5:
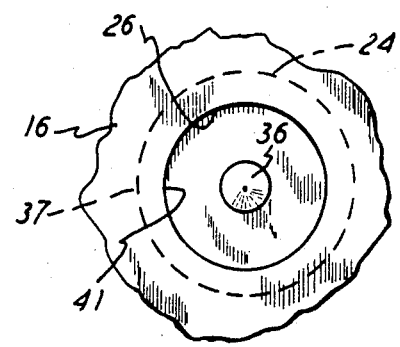
FIG. 5 is an enlarged right side view of a portion of FIG. 4.

FIGS. 4 and 5 show that the work piece end surface 37 is of an overall dimension, in this instance a diameter there-across, which is greater than the diameter of the circular cutting edge designated 41 in FIG. 5. With that arrangement, the work piece 24 cannot be inserted into the opening 21, and, in fact, not even the edge of the surface 37 can be inserted into the opening 21, and therefore the surface 37 cannot possibly be cut or marred by the cutting circular opening 41. So again, the operator can readily and with only a minimum of attention position the work piece 24 which cannot be damaged and only the burr 36 will be removed by the arcuate cutting edge 26 of the circular opening 41. The direction of the force of deburring or cutting off the burr 36 is always downwardly toward the cradle surfaces 29, by virtue of the concentric location of the cutting openings and by virtue of the location of the fixture 27 offset to the side of the axis 23 of rotation and on the downward side of rotation of the plate 16, all as shown in FIG. 2. This means that the fixture 27 will always give the necessary support for the deburring of the work piece 24, and the arcuate cutting surface 26 will serve to shear the burr 36, all as desired.

Figure 6:
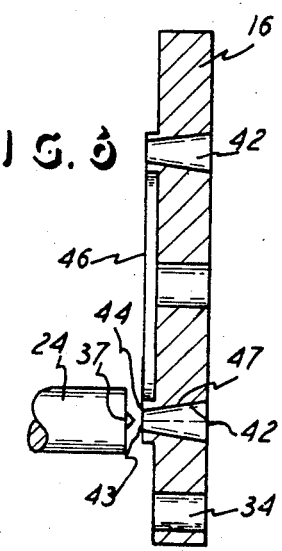
FIG. 6 is an enlarged sectional view taken along the line 6—6 of FIG. 2 and showing an embodiment of the invention different from that shown in FIG. 4.

FIG. 6 shows a different embodiment of the cutting plate 16, and here it will be seen that the openings are conical openings 42, and those can actually be the openings in the plate shown in FIG. 2. That is, the openings can either be cylindrical openings 21 or they can be conical openings 42. In the FIG. 6 embodiment, the smaller end 43 of the conical openings 42 is presented toward the work piece 24 so that there is an acute angle 44 between the plate foremost surface 46 and the wall 47 of the conical opening 42, as shown in FIG. 6. With that acute angle 44, there is an optimum arcuate cutting edge defined by the surface 46 and the conical opening 42.

FIGS. 2 and 6 further show that the surface 46 is a circular land 48 concentric with the axis 23 and extending aligned with but slightly beyond the openings 21 in their circular row, as shown in FIG. 2. With that arrangement, the work piece 42 can be slightly tipped, such as up and down as viewed in FIG. 6, so that its surface 37 can be optimumly aligned or flush with the land 48 and thereby best present the burr 36 to the cutting opening. That is, the width of the land 48 is significantly less than the diameter of the work piece end surface 37, as shown in FIG. 6, so that the up and down pivoting or rocking positioning of the work piece 24 can be achieved relative to the narrower land 48, for the purpose mentioned. This means that the burr 36 can be positioned closest to the cutting surface defined by the opening 43, and neither the plate 16 nor the edge of the work piece 37 will prevent that close relationship, since the narrow land 48 will permit maximum positioning or penetration of the burr 36.

So, there may be an annular land, such as land 48, aligned with each row of openings 21 and 34. Also, the openings 21 and 34 may be of different diameters, as shown, for different size work pieces, if desired, and they may be either cylindrical or conical, both as shown. The openings all present an arcuate cutting edge 26. Also, the fixture 28 which is parallel with the horizontal rotations axis 23 to effect the cutting action downwardly against the surface 28, that is, at right angles thereto. Fixture 27 can be shifted to the right in FIG. 2, and the plate 16 can be reversed in rotation, such as by the switch or mechanism 49. Thus, the hole can have its cutting edge 26 and also its arcuate cutting edge 51, depending upon the direction of rotation of the plate 16.

What is claimed is:

1. A deburring machine for cutting chips from a work piece, comprising a power means having a rotary adaptor being rotatably mounted, a cutter mounted on said adaptor and being rotatable therewith and having a fully exposed planar face on a vertical plane and said cutter being spaced from any structure in front of and behind said cutter or in contact with said face, all for free-fall clearance of falling chips from said work piece, said cutter having a circular row of circular openings extending at a right angle into said planar face, and an upwardly open V-Block fixture mounted offset from the axis of rotation of said cutter and adjacent to but spaced from said planar face and having two horizontally spaced-apart and upwardly open and unobstructed V-surfaces free of any structure thereabove and with the Vees thereof pointing in the direction of rotation of said cutter and also disposed aligned with the longitudinal axis of said circular openings upon rotation of said cutter past said fixture, for presenting said V-surfaces upwardly to receive a work piece resting downwardly thereon to counter the force on said work piece when said cutter is rotated in said direction and to thereby remove a burr from said work piece by said arcuate cutting edges.

2. The deubrring machine as claimed in claim 1, wherein said cutter has a planar face on opposite sides thereof and said circular openings extend through said cutter between said planar faces, and said cutter and said adaptor having mounting means for reversible mounting of said cutter on said adaptor to thereby-present either one of said planar faces adjacent said fixture.

3. The deburring machine as claimed in claim 1, wherein said cutter has at least two of said rows of said circular openings extending into said planar face and located at different radial distances from the center of rotation of said cutter, and an adjustable mounting for said fixture for moving said fixture into alternate alignment with each of said rows of said circular openings.

4. The deburring machine as claimed in claim 3, wherein said cutter has a planar face on opposite sides thereof and said circular openings extend through said cutter between said planar faces, and said cutter and said adaptor having mounting means for reversible mounting of said cutter on said adaptor to thereby present either one of said planar faces adjacent said fixture.

5. The deburring machine as claimed in claim 1, wherein two circular rows of said circular openings are of diameters different from each other for locating said circular openings of the respective said circular rows at radial distances from the center of rotation of said cutter different from each other, and including an adjustable mounting for said fixture for moving said fixture into alternate alignment with both of said rows of said circular openings.

6. The deburring machine as claimed in claim 5, wherein said circular openings of the respective said circular rows are of diameters different from each other.

7. The deburring machine as claimed in claim 1, wherein said cutter is reversible in rotation and said fixture is movably mounted for movement parallel to said planar face and is positionable to either side thereof relative to the axis of rotation of said cutter to have the V of said V-block point in the respective direction of rotation of the adjacent said side of said cutter, and reverse mechanism connected with said power means for reversing the direction of rotation of said cutter and thereby have either diametricaly opposite arcuate portion of said circular openings cut said work piece to remove said burr therefrom.

8. The deburring machine as claimed in claim 1, wherein said circular openings are conical and are disposed with their smaller diameters on said planar face.

* * * * *